July 3, 1962
G. R. ROSE
3,042,171
PROGRAMMED CONTROLLER
Filed Nov. 4, 1957
3 Sheets-Sheet 1
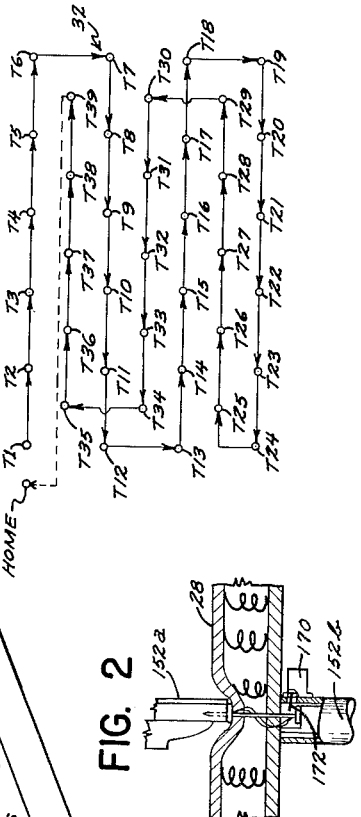
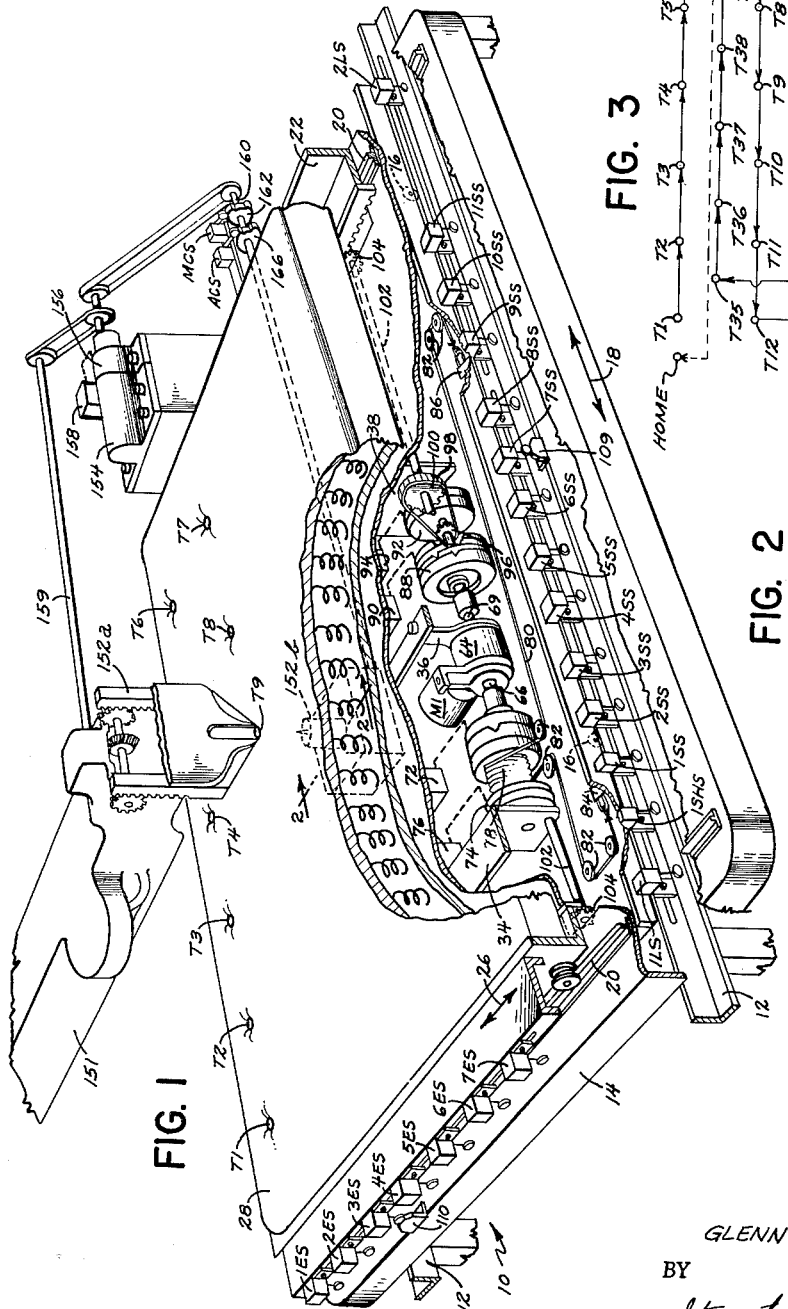
INVENTOR.
GLENN R. ROSE
BY
Stuart R. Peterson
ATTORNEY

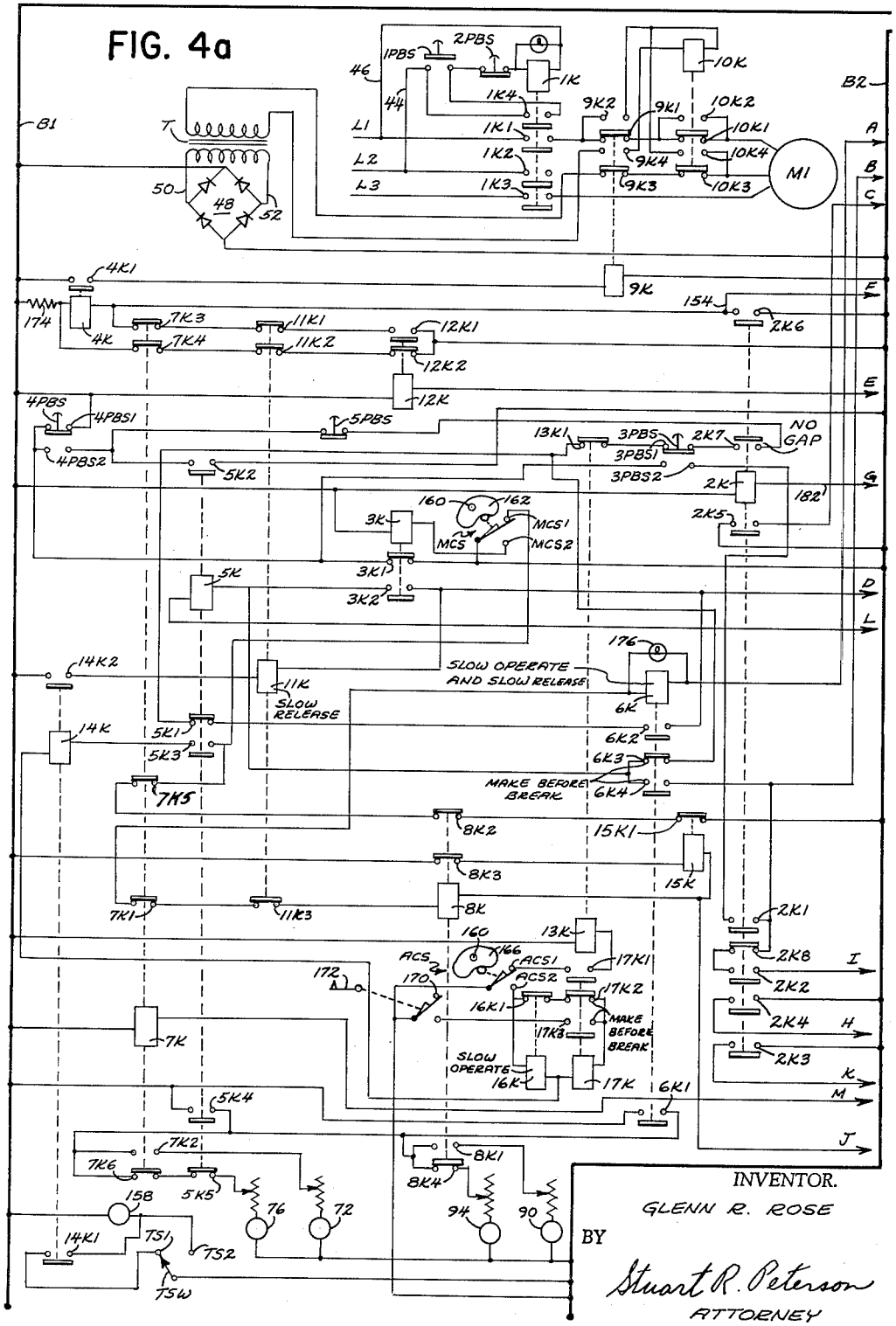

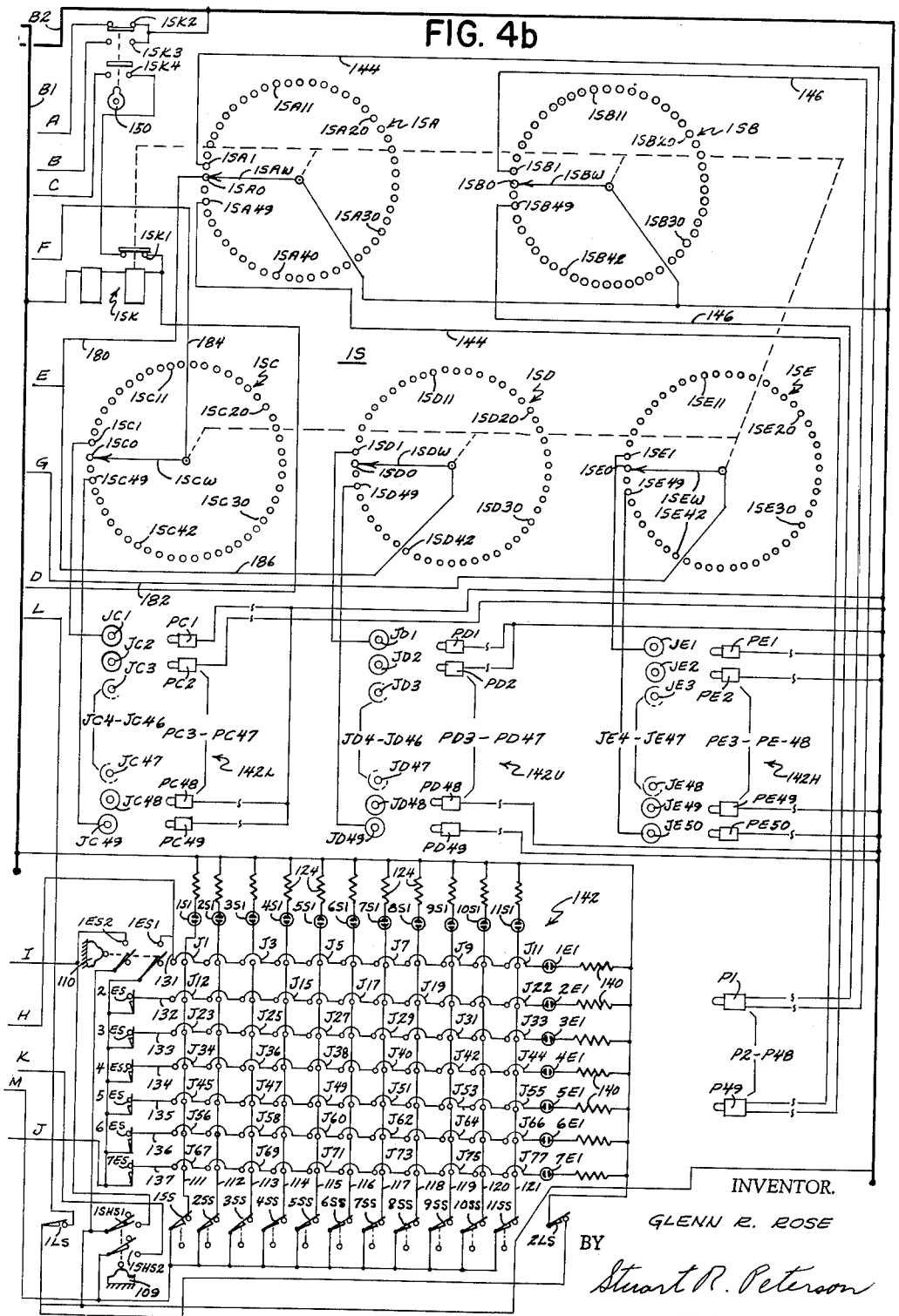

United States Patent Office 3,042,171
Patented July 3, 1962

3,042,171
PROGRAMMED CONTROLLER
Glenn R. Rose, St. Paul, Minn., assignor to General Mills, Inc., a corporation of Delaware
Filed Nov. 4, 1957, Ser. No. 694,338
4 Claims. (Cl. 192—143)

This invention relates generally to a sequence control system and more specifically to work positioning apparatus where a preferred sequence of operations is to be carried out at different locations on the work. In one form, the invention deals with a controller that will relatively position a work supporting table with respect to a work performing implement so that work performing operations may be effectively carried out at preferred locations on the work according to a preselected program or plan. Still more specifically, it is an aim of the invention to use a pair of perpendicularly movable work tables one of which carries the work, and by moving these work tables at proper intervals the particular table carrying the work is accurately positioned so that the work performing operations can be satisfactorily carried out. While the invention will have rather wide utility, one specific embodiment that the invention may assume is in the form of an automatic mattress tufter.

One basic object of the invention is to provide a sequence control system, the pattern of which may be varied to suit different conditions.

One object of the invention is to position a work table in an automatic manner so that work performing operations may be carried out at preferred spaced locations on the work supported by the table.

Another object of the invention is to provide a programmed positioning controller in which the program is accurately controlled by a plug board. In this way the coordinates of any pattern can be readily changed so that the work performing pattern may be quickly varied from an original pattern to a new one. Therefore an aim of the invention is to provide apparatus of the foregoing character in which the operator may select his own work performing schedule and may vary such schedule as circumstances dictate. For example, it is possible at one time to have the controller function so as to perform a work performing operation at each plug location and on a subsequent piece of work to utilize, say, only every other plug so that the work performing operations are effected at every other work location. Practically any configuration is possible, however.

Another object of the invention is to provide a programmed positioning controller that will automatically return to a home position at the end of a complete work cycle. Also it is an aim of the invention to provide means for stopping a work cycle at any given time and when such work cycle is re-initiated the work will be performed at the location where said cycle has been previously stopped.

Still another object of the invention is to provide effective interlocking means so that the work table can not be moved when the work performing head is in an interfering relationship therewith. Consequently provision is made so that the apparatus is self-protecting and can not be operated even on a manual basis in a manner so as to damage any of the working parts.

Yet another object of the invention is to provide for detecting when an element that is to be inserted in the work is missing. In this way when the invention is utilized for mattress tufting for instance, the detecting means is employed so as to sense when a button is missing from the work performing head so that attention will be called to this fact.

Another object is to utilize only a single 3-phase motor for driving the superimposed work tables, and because frequent motor reversal is contemplated, provision is made for preventing short circuits during phase reversal of the motor.

Of course the invention is not limited to button insertions but may be used where other elements are to be applied to the work such as in carrying out riveting operations. At this time it might also be explained that the invention would be suitable for performing drilling operations, spot welding operations, and the like.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a perspective view of a mattress tufting machine equipped with my automatic controller, portions of the machine having been removed so as to expose certain of the operating parts;

FIG. 2 is a sectional detail view taken in the direction of line 2—2 of FIG. 1;

FIG. 3 is a tufting pattern diagram illustrating the relative path that a sequence of tufting operations might follow; and FIGS. 4A and 4B when placed side by side provide a schematic wiring diagram illustrating the various control features incorporated into the apparatus that has been selected to exemplify the invention.

*Mechanical Tufting Apparatus*

Referring first to FIG. 1, it will be observed that the apparatus as depicted comprises a stationary frame 10 equipped with longitudinally directed tracks 12 on its upper face. These tracks 12 provide a runway for a longitudinal movable table 14 having wheels 16 engageable with said tracks. The table 14 is constrained so as to traverse a reciprocal path designated by the double headed arrow 18.

On the upper face of the table 14 is disposed a pair of transverse tracks 20. A transversely movable table 22 having wheels 24 is guided by these transverse tracks 20. As indicated by the arrow 26, the table 22 is caused to be moved perpendicularly with respect to the table 14.

It is the upper table 22 that is intended to support a mattress 28 to be tufted. A series of tufts T1–T9 have been shown and the particular sequence in which these tufts and other tufts T10–T39 are formed is indicated in the diagram labelled 32 which appears in FIG. 3. More will be said later on concerning this diagram and the particular way in which the individual tufts are made.

*Drive for Tufting Apparatus*

Forming portions of the frame 10 are brackets 34, 36, and 38. These brackets serve as the collective support for the driving means which positions the tables 14 and 22. The driving means includes a three-phase reversible table driving motor M1, this being the only motor that is used for positioning the two tables 14 and 22. As the description progresses it will be apparent that certain clutch and reversing arrangements are incorporated into the apparatus which permit the utilization of only a single driving motor. Power supply for the motor M1 is furnished by three phase power lines indicated by the characters L1, L2 and L3 (FIG. 4). A relay or main power contactor 1K (also FIG. 4) functions to energize the motor M1 from the power lines L1, L2 and L3, there being a plurality of contacts 1K1, 1K2, and 1K3 which when closed furnish energy to said motor M1. The relay or main power contactor 1K also includes a set of contacts 1K4. Leading from the lines L2 and L1 are conductors 44 and 46 which serve to energize the relay 1K. However, a pair of push button switches 1PBS and 2PBS are connected in serial fashion with the relay and the conductor 44. From the diagram it can be seen that the contacts 1K4 are in shunting relationship with the normally open push buttons 1PBS, so once the push button 1PBS is depressed, the relay 1K will seal itself in through the contacts 1K4 until the normally closed push button 2PBS has been depressed. Thus the push button 1PBS serves as a "Power On" button and the push button 2PBS serves as a "Power Off" button. More will be said hereinafter concerning the manner in which motor M1 is reversed. However, this discussion is better reserved, it is believed, until a later stage of the written presentation.

It will be observed that a transformer T is energized from the lines L2 and L3 (at the same time that the motor M1 is energized) when the contacts 1K2 and 1K3 are closed. This transformer supplies voltage to a full wave rectifier 48 via the conductors 50 and 52. The purpose of the rectifier 48 is to supply the proper D.C. potential to a pair of control buses, B1 and B2. In the ensuing description we will assume that the bus B1 is positive and the bus B2 is negative.

Before proceeding further with the description of the electrical diagram set forth in FIG. 4, the apparatus pictured in FIGS. 1 and 2 should be explained with more particularity so that the reader will have a good foundation for understanding the various electrical components utilized in the control circuitry. Accordingly reference should be made once again to FIG. 1 where it will be seen that the motor M1 is connected to a set of gears 64. Issuing in opposite directions from the set of gears 64 are shafts 66 and 68. The shaft 66 leads to a clutch 70 for the table 14, this clutch being operable by a solenoid 72, the mechanical connection between said solenoid 72 and the clutch 70 being designated only schematically by a series of dashes. Also associated with the operation of the table 14 is a brake 74 which is actuated into braking position by means of a solenoid 76. Further included in the means for positioning the table 14 is a cable drum 78 having wrapped therearound a cable 80. As shown in FIG. 1 the cable 80 passes about a plurality of sheaves or pulleys 82 and has its opposite ends fixedly attached to the table 14 at locations 84 and 86.

The shaft 68 leads to a clutch 88 for the table 22, this clutch being actuatable by means of a solenoid 90. Also associated with the operation of the table 22 is a brake 92 which is actuatable into braking position by way of a solenoid 94. When the clutch 88 is engaged it will cause rotation of a first sprocket 96 having entrained thereabout a chain 98, which chain passes about a second sprocket 100. The second sprocket 100 is mounted on one end of a driven shaft 102, the central portion of which has been broken away. This shaft 102 carries at its opposite ends a pair of gears 104 which are engageable with racks 106 disposed along the underside of the table 22. The table 14, of course, need not be fully covered with a plate so therefore adequate openings or slots are provided through which the gears 104 extend in order to effect engagement thereof with the two racks 106. As a matter of fact both tables 14 and 22 can be only skeleton outlines.

*Tuft Location*

From both FIGS. 1 and 4, it will be perceived that there is a switch actuator or cam 109 for operating a plurality of switches 1SS, 2SS, 3SS, 4SS, 5SS, 6SS, 7SS, 8SS, 9SS, 10SS, 11SS, 1LS, 2LS, and 1SHS, the latter being composed of two levels designated as 1SHS and 1SHS2 (only FIG. 4). These switches are all mounted on the table 14. While not completely apparent from FIG. 1, these switches are positionable with respect to each other so as to permit preferred spacing thereof, which will result in producing the proper longitudinal spacing between the tufts T1–T39. Actually, only the switches 1SS–11SS are responsible for positioning the tufts T1–T39 in a longitudinal direction. The switches 1LS and 2LS are limit switches which are only operated in extreme positions of the table 14. The switch 1SHS is a homing switch and it will be operated when the table 14 is moved to its homing position as will become more apparent hereinafter.

While the switches 1SS–11SS are responsible for locating the tufts 32 in a longitudinal direction of the mattress 28, there are additional switches 1ES, 2ES, 3ES, 4ES, 5ES, 6ES, and 7ES which locate the tufts 32 in a lateral or transverse direction. As seen from FIG. 4, the switch 1ES is composed of two sections 1ES1 and 1ES2. In addition to locating the table 22 in a position in which the first work performing or tufting operation can be performed, the switch 1ES functions as a homing switch as will be explained in more detail hereinafter.

A plurality of conductors, one for each of the switches 1SS–11SS is provided and these conductors have been designated as 111, 112, 113, 114, 115, 116, 117, 118, 119, 120, 121. In circuit with these various conductors 111–121 are indicating lights 1SI, 2SI, 3SI, 4SI, 5SI, 6SI, 7SI, 8SI, 9SI, 10SI and 11SI. In further circuit with the conductors 111–121 and the indicating lights 1SI–11SI are current limiting resistors 124. These current limiting resistors have one end connected directly to the positive bus B1.

Corresponding to the conductors 111–121 in function is a plurality of conductors 131, 132, 133, 134, 135, 136, and 137 which are connected in circuit with the switches 1ES–7ES. In further correspondence with the circuit arrangement described in the preceding paragraph are indicating lights 1EI, 2EI, 3EI, 4EI, 5EI, 6EI, and 7EI. These indicating lights are connected directly to current limiting resistors 140 which are in turn connected to the positive bus B1.

As can be discerned from FIG. 4, the criss-crossing conductors 111–121 and 131–137 have terminals adjacent their crossover points, which form a multiplicity of two terminal jacks J1, J2, J3, J4 . . . J77. The role played by these two terminal jacks J1–J77 will be set forth with greater particularity later on.

At this particular point of the description it will be stated that the above switches together with the indicating lights and the two terminal jacks all constitute a patch panel 142 for accommodation of tufting sequence plugs. These tufting sequence plugs are not all shown but it will be manifest, it is believed, that a preferred number of such plugs can be utilized. Only two of these plugs have actually been illustrated and have been given reference numerals P1 and P49. Although 77 possible positions are illustrated on the patch panel 142 provision is made for utilizing only as many as 49 of these jacks at a given time. If circumstances so require, more plugs P1–P49 could be employed. On the other hand, a fewer number could be utilized. The specific number is completely arbitrary and is governed by the specific requirements of the work being handled. The plugs P1–P49 have conductors 144 and 146 connected thereto and these conductors lead to a stepping switch described in more detail in the following paragraph.

The stepping switch alluded to above is designated in its entirety by the character 1S and includes a pair of operating coils 1SK which are connected directly to the positive bus B1. The other side of these operating coils are connected in an indicated manner to the negative bus B2 but inasmuch as a considerable amount of circuitry is interposed between the operating coils and the negative bus B2 the description of such connection is better reserved for discussion in a subsequent portion of the overall description. Associated with the operating coils 1SK is a set of self-interrupting contacts 1SK1. These contacts are quite conventional and need not be described other than to say that they energize and deenergize the operating coils 1SK in order to effect the advancing of the stepping switch, the actual physical advancement of the stepping switch taking place through spring action. Under the supervisory control of the operating coils 1SK is a cam 150 which functions to actuate several sets of "Off Normal" contacts 1SK2, 1SK3, and 1SK4. From the electrical diagram it can be seen that the contacts 1SK2 are closed when the cam 150 is in its depicted position whereas the contacts 1SK3 and 1SK4 are then open. Owing to the configuration of the cam 150 the contacts 1SK2 are held closed only when the stepping switch 1S is in its home position whereas the contacts 1SK3 and 1SK4 are held open when the stepping switch is in its home position.

Continuing with the description of the stepping switch 1S, it may be explained that the switch further includes five switch levels 1SA, 1SB, 1SC, 1SD, and 1SE. These switch levels have wiper arms 1SAW, 1SBW, 1SCW, 1SDW, and 1SEW that are electrically connected in a specified manner. However, at this time it can be pointed out that the wiper arms 1SAW and 1SBW are connected directly to the negative bus B2. The specific manner as to how the remaining wiper arms are connected will be dealt with later on. The wiper arms 1SAW–1SEW are of course all actuated in unison by the energization and deenergization of the operating coils 1SK. As pictured, the wiper arms are all in their home position and therefore are engaging the homing contacts 1SA0, 1SB0, 1SC0, 1SD0, and 1SE0. However only the homing contact 1SA0 is actually used as will become apparent in a subsequent portion of the circuit description.

As pointed out in the paragraph before the preceding paragraph, conductors 144 and 146 are utilized. These conductors, it will now be explained, are used in connecting the plugs P1–P49 to the various fixed contacts of the switch levels 1SAW and 1SBW. Considering the connection of plug P1 for instance, it will be observed that the conductor 144 leads to the first fixed contact of the level 1SA which has been designated as contact 1SA1. The other conductor 146 leads from the first fixed contact of the level 1SB to the plug P1 and has been indicated by the character 1SB1. Similarly all of the intervening plugs would be connected in the same way, although to different fixed contacts, and to make sure that the reader fully comprehends the mode of connection, it will be pointed out at this time that plug P49 has its conductor 144 connected directly to the 49th contact labelled 1SA49 of the level 1SAW, whereas the conductor 146 leading from the plug P49 connects to the 49th fixed contact of the level 1SB, said 49th contact bearing the character 1SB49.

By way of review it will be noted that the various levels 1SAW–1SEW each comprise 51 contacts, one of such contacts being utilized as a homing contact. Thus when the plug P1, for instance, is mated with jack J1, the tables 14 and 22 will be moved into the No. 1 tufting position. Similarly when the plug 49, as well as any selected intervening plugs, has been engaged with any of the jacks J2–J77 the tables 14 and 22 will be caused to be positioned at locations which will cause a tufting operation to occur on the mattress 28, which location will correspond to the particular plug and jack that have been connected. The specific manner in which this positioning objective is achieved will become clearer as the description progresses, it is believed. However, what has herein been said will serve as a preface to an understanding of the goal that is to be accomplished.

*Head Actuation*

Up to this point nothing has been said about the configuration of the work performing head. Therefore attention is redirected to FIG. 1 where there appears a stationary support arm 151 which overhangs the tables 14 and 22. This arm 151 supports a vertically movable upper head 152a which is operated by a head motor 154 and a lower head 152b (FIG. 2) also powered by said said motor 154. The head motor is connected to a main clutch 156 that is actuatable by a solenoid 158 (FIG. 4). Inasmuch as the mechanical linkage for actuating the heads 152a and 152b is relatively complicated and since its understanding is not essential to an understanding of the instant invention, it has not been set forth with any degree of particularity. However, if further information is desired, reference may be made to Patent No. 1,922,212. For purposes of simplifying the drawing only a shaft 159 has been depicted for actuating the upper head 152a, and a similar shaft 160 is employed for the lower head 152b. Driven by the head motor, though, is the shaft 160 which has mounted thereon a master cam 162. Associated with the master cam 162 is a master cam switch MCS operated by said cam 162 to control the tufting sequence. From FIG. 4 it can be discerned that the master cam switch MCS is composed of switch sections MCS1 and MCS2. The combined lower head and cam shaft 160 additionally has mounted thereon an auxiliary cam 166. The office of this auxiliary cam 166 is to operate an auxiliary cam switch ACS which is composed of switch sections ACS1 and ACS2. This cam switch ACS is utilized in the detection of button misses. There is also a button detector switch 170 which has associated therewith an actuator 172 which is engaged by a button in the exemplified situation. Stated somewhat differently, if there is no button present, the switch 170 will remain inoperative and the equipment will be inactivated.

*Initial Homing Operation*

Referring once again in detail to FIG. 4, the homing operation of the apparatus will now be described. With this in mind it may be stated that there is a homing push button switch 3PBS composed of normally closed contacts 3PBS1 and normally open contacts 3PBS2. Generally stated, whenever it is desired to bring the tables 14 and 22 to their home position, the push button switch 3PBS will be depressed, although as more fully treated hereafter homing is usually achieved in an automatic fashion.

Cooperating in the return of the tables 14 and 22 to their home poistions is a first home relay 2K having a number of sets of contacts operated thereby which contacts have been indicated by the characters 2K1, 2K2, 2K3, 2K4, 2K5, 2K6, 2K7, and 2K8. One side of the relay 2K is connected directly to the positive bus B1 and the other side can reach the negative bus B2 via the push button section 3PBS2 and normally closed contacts 3K1 belonging to a tufting sequence relay 3K, which is the slave of the master cam switch MCS, since the operating coil of the relay 3K is connectable to the negative bus B2 through the switch section MCS2. In addition to its normally closed contacts 3K1 the relay 3K has a set of normally open contacts 3K2 which will be described at a later time.

At any rate, it will be apparent that the relay 2K picks up through the switch section 3PBS2, when the push button 3PBS is actuated, through normally closed contacts 3K1, and seals itself in through contacts 2K1 and the off normal contacts 1SK3 of the stepping switch 1S. There is, however, another electrical path that will cause energization of relay 2K but inasmuch as this path is effected through circuitry yet to be described, postponement of specific reference to this second paralleling path will be made until the home control jack arrangement is described in detail.

Once having been operated, the relay 2K is also capable of being maintained in an operated condition through its now closed contacts 2K2 and the switch sections 1SHS1 and 1ES2 which will be closed if the switch actuators 109 and 110 are in any position other than the home positions of the tables 14 and 22. Consequently both of the tables 14 and 22 must be returned to their home positions before the switch sections 1SHS1 and 1ES2 open.

Another thing that occurs when relay 2K is energized is that the stepping switch coils 1SK connect to the negative bus B2 via its now closed contacts 2K3. It should be emphasized at this time that the contacts 1SK4 will be closed whenever the stepping switch 1S is in an off normal position. Stated somewhat differently, the cam 150 will be rotated from the 12 o'clock position in which it appears in FIG. 4 whenever the stepping switch 1S is in a position other than its home position. Because of the closure of the contacts 1SK4 it should be apparent to those familiar with stepping switches that the stepping switch 1S is automatically stepped to its home position for once the contacts 1SK1 open, the coils 1SK are deenergized and under the influence of spring action the stepping switch is advanced one contact position. It is the repetitive opening and closing of the self-interrupting contacts 1SK1 in conjunction with the contacts 1SK4 that will return the stepping switch 1S to its home position, said contacts 1SK4 remaining closed until homing position of the stepping switch 1S is actually reached.

Reference will now be made to a side direction relay 4K which is energized by way of the contacts 2K6 inasmuch as the relay 4K is connected to the positive bus B1 via a resistor 174. Provision is made for at times connecting one side of the resistor 174 directly to the negative bus B2; however when this direct shunting path is not provided then the relay 4K will be energized since the other side of the resistor 174 is connected directly to the positive bus B1. There are actually several paths that can be utilized in energizing the relay 4K for it is apparent that energization thereof can be via the conductor 184 leading to the switch level 1SC, via the contacts 2K6 which have just been mentioned and also another path that appears in the drawing which has not yet been described.

At any rate, it is to be explained that the side direction relay 4K has a set of normally open contacts 4K1 which are in circuit with a primary reversing relay that will subsequently be described.

Concomitantly with the energization of the relay 2K is the opening of two contacts 2K7 which assure deenergization of a "Start" relay 5K in case the home push button switch 3PBS was pushed when the circuit was in "Auto" cycle. The relay 5K is provided with five sets of contacts 5K1, 5K2, 5K3, 5K4, 5K5 and their specific connection in the over-all circuit will be explained hereinafter. Inasmuch as the relay 2K has its contacts 2K8 in circuit therewith any false operation of relay 5K during the homing operation will be obviated.

It has already been explained that the relay 2K will remain operated until the stepping switch 1S is returned to its home position. This is because of the normal contacts 1SK3 will then be closed and will open only when the cam 150 has returned to its 12 o'clock or home position. It will be recalled that the stepping switch 1S is stepped through its self-interrupting contacts 1SK1 and the cam actuated contacts 1SK4, the cam actuated contacts being closed whenever the cam 150 is in a rotated position that is displaced from its 12 o'clock or home position.

It will also be observed that when the cam 150 has been rotated into its home position that the off normal contacts 1SK2 are again closed. These contacts 1SK2 are in circuit with a second home relay 6K having contacts 6K1, 6K2, 6K3, and 6K4. This relay is a "Slow Operate, Slow Release" one, and the contacts 6K3, 6K4 are of the "Make Before Break" type. Also associated with the relay 6K is a shunt connected indicating light 176 which will become lighted whenever the relay 6K is energized as it will be when the stepping switch 1S is returned to its home position.

*Circuitry for Homing Operation*

In the preceding discussion the events that occur have not dealt with the actual manner in which the tables 14 and 22 are compelled to seek their home position. All that we have assumed is that they reach their home position because certain conditions take place. Therefore at this time a discussion of the circuit components which are responsible for the homing action will be described. First, mention will be made of a side control relay 7K for the main table 14. Basically this relay 7K switches the necessary operating voltage from the brake solenoid 76 to the clutch solenoid 72 when movement of the table 14 is required. Carried by the relay 7K are contacts 7K1, 7K2, 7K3, 7K4, 7K5, and 7K6. While insufficient information has been given at this time to understand fully the role played by the relay 7K, nonetheless it will suffice for the moment to say that when the table 14 reaches its home position the switch section 1SHS2 opens and the relay 7K drops out, thereby closing its contacts 7K1.

The closing of the contacts 7K1 is responsible for energization of an end control relay 8K, which controls the operation of the upper table 22, actually functioning so as to switch the operating voltage from the brake solenoid 94 to the clutch solenoid 90. Operable by the relay 8K are contacts 8K1, 8K2, and 8K3.

When the relay 7K is energized through the switch section 1SHS2 to start the main table 14 in its homing direction, its contacts 7K2 are closed and the closure of these contacts 7K2 energizes the side clutch solenoid 72. Parenthetically at this time it might be explained that the contacts 6K1 belonging to the relay 6K are closed during this procedure because the stepping switch 1S is in home position. In other words, the stepping switch 1S moves to its home position in advance of the tables 14 and 22 moving to their respective home positions. Thus the stepping switch 1S literally paves the way for the subsequent return of the tables 14 and 22 to their home locations. When the clutch solenoid 72 is energized it will be understood that the drive motor M1 is then clutched so that cable drum 78 is rotated in a direction to move the table 14 to the left as viewed in FIG. 1. When the switch actuator 109 reaches the switch 1SHS, then the switch section 1SHS2 is opened to deenergize relay 7K. During the energization of relay 7K, its contacts 7K1 were opened so as to prevent energization of the end relay 8K.

Now that the table 14 has been brought to its home position and with the result that the contacts 7K1 have been closed, then it becomes apparent that the end relay 8K picks up to close its contacts 8K1, thereby energizing the solenoid 90 for the end clutch 88. Energization of the solenoid 90, of course, effects drive of the shaft 102 through the sprocket 96, chain 98 and the sprocket 100 so as to rotate the gears 104 underlying the racks 106. In this way, the upper table 22 is moved toward the left as viewed in FIG. 1. When the table 22 reaches its home position, then its switch actuator 110 engages the switch 1ES so as to open its switch section 1ES1 to drop out the relay 8K.

It will be remembered that the drive motor M1 was referred to as being a reversible three-phase motor. Thus while the clutches 70 and 88 function so as to couple the motor M1 at the proper times to the tables 14 and 22, nonetheless provision must be made for assuring that the motor M1 will rotate in the proper direction to effect the desired homing directions of these two tables. One relay that cooperates in achieving the proper directional movement of the table 14 has already been mentioned, this relay being relay 4K. When the relay 4K is energized, it closes its contacts 4K1 which are in circuit with a relay 9K. The relay 9K is actually a primary relay serving to reverse the direction of the table motor M1 and has four sets of contacts designated as 9K1, 9K2, 9K3, and 9K4. However in order to avoid any chance of short circuits occurring during phase reversal, a secondary or slave relay 10K is utilized in conjunction with the relay 9K in bringing about the proper phase reversal so that the motor M1 will rotate in the appropriate direction. The relay 10K is equipped with contacts 10K1, 10K2, 10K3, and 10K4. The relay 6K is energized by the closure of contacts 9K2 and 9K4 and the result of this connection is that the relay 10K is actually connected across lines L1 and L2 because the relay 1K during this interval is energized so as to close all of its contacts 1K1, 1K2, 1K3, and 1K4, contacts 1K1 and 1K2 being in the lines L1 and L2. The picking up of relay 10K, of course, closes its contacts 10K2 and 10K4 but only after contacts 9K1 and 9K3 have completely opened. As already indicated this avoids any danger of drawing an arc that would create a short between phases and is an important part of the invention inasmuch as the invention utilizes only one drive motor M1 to move both of the tables 14 and 22. Constant reversal as is necessary in the utilization of only one drive motor makes it mandatory that suitable provision be made for minimizing or obviating any chance of electrical faults occurring.

Consequently whenever the relay 9K is picked up the table 14 is moved to its home position, that is to the left, as viewed in FIG. 1. During this period the relay 7K is of course energized so that its contacts 7K2 and 7K3 are open. Because of the contacts 7K3 being open, the relay 4K will be energized via the resistor 174. When contacts 7K4 are closed, however, together with contacts 11K2 and 12K2 being closed, then one side of the resistor is connected directly to the negative bus B2 whereas the other side thereof is always connected directly to the positive bus B1.

When table 14 reaches its home position the relay 7K will be deenergized and at that time the switch actuator 109 will open the switch section 1SHS1. Deenergization of the relay 7K causes its contacts 7K2 to open and its contacts 7K6 to close. This occurrence will deenergize the solenoid 72 and energize the solenoid 76 so that the brake 74 is then applied to the table 14.

*Order in Which Homing Occurs*

There is provided a time delay relay 11K for insuring that the side movement is always made first prior to any upper table movement. In other words, it is necessary to make sure that the table 14 will move to its home position before any movement of the table 22 occurs. In addition, the relay 11K is responsible for properly sequencing the direction control. Therefore the relay 11K is equipped with contacts 11K1, 11K2, and 11K3. One thing that the relay 11K does inasmuch as its contacts 11K2 are in circuit with contacts 7K4 and 12K2 is to provide a path via these three sets of contacts from the resistor 174 to the negative bus B2 when the relay 11K is deenergized. This, as already pointed out, precludes operation of the relay 4K because the relay 4K depends for its operation upon the closure of all three sets of contacts, that is contacts 7K4, 11K2, and 12K2.

While contacts 12K2 have already been mentioned, nothing has been said as yet concerning the relay which actuates these particular contacts. Accordingly at this time mention will be made of end direction relay 12K. This relay functions to provide proper motor rotation to move the upper table 22 in the correct direction. In addition to the contacts 12K2 which have already been referred to, there are contacts 12K1 that are normally open, these contacts 12K1 being in series relationship with the contacts 11K1 and 7K3.

The manner in which the relay 12K may be energized is via a conductor 180 leading to the home contact 1SA0 belonging to the switch level 1SA of the stepping switch 1S. Thus once the stepping switch 1S has reached its home position, as it will have done in advance of any required energization of the relay 12K, the relay 12K will pick up, thereby opening its contacts 12K2 so that the relay 4K is permitted to be energized, since contacts 12K2 in their closed position will prevent energization of said relay 4K. The thing to be understood at the moment is that the relay 4K is maintained in an energized state to complete the entire homing operation, that is, to get both the tables 14 and 22 to their respective homing positions.

*Automatic Starting*

Before actually describing the "Auto Start" and "Tufting Sequence," reference will be made to an auto start push button switch 4PBS having a first section 4PBS1 connected directly to the positive bus B1 and a second section 4PBS2. There is also provided a stop push button switch 5PBS which is in circuit relationship with the section 4PBS2. For the moment it will be assumed that the tufter head 152a is completely clear—that is, it has been retracted from any interfering relationship with the mattress 28. Actually, precautionary measures are taken to inactivate the circuitry if the head 152a has not been properly withdrawn. However, these precautionary measures and the circuitry for carrying them out will be described hereinafter.

Closure of the push button section 4PBS2 establishes certain conditions. First, it results in the connection of the stepping switch coils 1SK from the positive bus B1 to the negative bus B2 through contacts 5K1, 6K2, 13K1 (the relay therefor to be referred to presently), 2K7, 3PBS1, 5PBS, 4PBS2, and 3K1. Although more will be said in a short time about the relay 13K, it might be stated at this time that it cooperates with two other relays in determining whether there have been any button misses in the tufting operation.

Continuing with what occurs when the switch section 4PBS2 is closed, it will be noted that energization of the stepping switch coils 1SK1 loads their stepping spring and when the push button 4PBS is released from its depressed position, the stepping switch 1S steps immediately to its first position—that is, the various wiper arms 1SAW, 1SBW, 1SCW, 1SDW, 1SEW all move in unison to their respective first contacts 1SA1, 1SB1, 1SC1, 1SD1, and 1SE1. This causes operation of the off normal contacts so that contacts 1SK2 open, 1SK3 close, and 1SK4 close.

Because of the stepping of the switch 1S to its first contact position, the relay 6K is released because of the off normal contacts 1SK2 being permitted to open. This effects connection from the positive bus B1 through the relay 5K so that the relay 5K is picked up through the contacts 2LS, 1LS, 6K4, 2K8, 1SK3 to the negative bus B2. Thus when the relay 5K operates, it lights its indicator light 186 which is in shunting relation with the operating coil for the relay 5K. It will be recalled that the relay 5K is the start relay and functions when the auto start button is operated to place the entire system into tufting operation. The relay 5K seals itself in through contacts 5K2 via contacts 6K3, 13K1, 2K7, 3PBS1, and 5PBS. It has already been explained that the contacts 6K3 and 6K4 are of the "Make Before Break" variety. The pick up of the relay 5K prevents any false stepping of the stepping switch 1S on complete release of the relay 6K because the contacts 5K1 of the relay 5K then open.

In preparation for the energization of the tufter clutch solenoid 158, the contacts 5K3 close. The tufter clutch relay has been designated by the symbol 14K and serves to control the tufter clutch 156 by controlling the energization of the solenoid 158. The primary responsibility of the relay 14K is to prevent tufter needle damage when either table 14 or 22 is in motion. Therefore the tufter clutch relay 14K is provided with contacts 14K1 in series with the tufter solenoid 158 and contacts 14K2 in series with the time delay relay 11K.

Referring now to the existence of a tufter switch TS, it will be noted that this switch has two positions, one being designated as "Auto" and the other as "Manual."

The contact for the "Auto" position has been indicated as TS1 and the "Manual" position as TS2. There is a switch arm TSW that is movable between the contacts TS1 and TS2 so as to engage either of these two contacts. Normally the arm TSW will be left in engagement with the contact TS1 so as to effect automatic operation.

*General Operation*

In preparation for the energization of either the side clutch 72 or the end clutch 90, the relay 5K is provided with normally open contacts 5K4 which have been alluded to above. These contacts, as can be seen from FIG. 4, will close so as to connect both sets of contacts 7K6 and 8K4 to the positive bus B1. Thus while the side brake and end brake solenoids 76 and 94 will be energized so that no motion of the tables 14 and 22 ensues, nonetheless they are in readiness as far as preparing an energized path down to the contacts 7K2 and 8K1 so that when these contacts are operated by their respective relay coils the clutch solenoids 72 and 90 will be properly energized.

By way of interjection at the present moment, it can be stated that when stepping switch 1S was stepped to its first contact position the switch levels 1SA and 1SB had their first contacts 1SA1 and 1SB1 connected to plug P1 through the wiper arms 1SAW and 1SBW. Of course it will be remembered that the wiper arms 1SAW and 1SBW are both connected directly to the negative bus B2. Now it can be appreciated, it is believed, that with plug P1 for instance engaged with jack J1 there is connection to switches 1SS and 1ES1. Relay 7K is energized through the switch 1SS until this particular switch 1SS is opened by the switch actuator 109. Release of the relay 7K immediately applies braking action to the table 14 because the contacts 7K6 close to energize the brake applying solenoid 76. This results in the lighting of indicating light 1S1.

On the release of the relay 7K, the relay 8K picks up, for the table 22 is in No. 1 position as called for by the engagement of the plug P1 with the jack J1. Under the assumed set of circumstances, however, we have made the home position of the table 22 correspond with the No. 1 tufting position as far as its relationship with the table 14 is concerned. It will be remembered though that the table 14 is moved to the left beyond the No. 1 position, i.e., T1, so that the two tables 14 and 22 are actually displaced far enough from beneath the tufting head 152a so that the mattress 32 can be readily positioned on the upper table TT. Therefore there is no movement required of the table 22 with respect to the table 14 at this time and this is recognized by the apparatus inasmuch as the switch section 1ES1 is already open due to the engagement of the actuator 110 with the switch 1ES. If this were not the situation then the relay 8K would have become energized via contacts 7K1, 11K3, and switch section 1ES1.

Owing to the fact that relay 8K does not pick up at this time its contacts 8K2 remain closed. Since contacts 7K5 of relay 7K are also now closed, as are contacts 15K1 of the transfer relay 15K, the clutch relay 14K becomes energized to close its contacts 14K1 and thereby operate the tufter clutch 158 via the solenoid 156. Such action results in rotation of the cam 162 with the consequence that slave relay 3K is caused to be picked up through the contacts MCS1 of the cam operated switch MCS. By reason of this happening the operating coils 1SK of the stepping switch are energized through contacts 3K2. When tuft T1 is completed, the contacts 3K2 are opened, since relay 3K is released because the cam 162 permits return of the switch MCS to its MCS1 position. This causes the stepping switch 1S to be stepped to its next contact position.

From the above it can be seen that the wiper arms 1SAW, 1SBW, 1SCW, 1SDW and 1SEW now engage their respective contacts 1SA2, 1SB2, 1SC2, 1SD2, and 1SE2. Inasmuch as P2 (and hence contacts 1SA2 and 1SB2) is connected to jack J3 (see the hereinafter presented tabulation) the way has been paved for the table 14 to move to its T2 position and it does so, the switch 2CS opening when this position is reached.

It is believed readily apparent that there is no need for the table 22 to be moved relative to the table 14 until after tuft T6 has been completed, so relay 8K does not pick up during the making of the first row of tufts T1–T6. However, under our selected program, which appears in detail later on, plug P7 has been inserted in jack J33. This involves the use of conductor 133 which has the closed switch 3ES in circuit therewith. Of course switch 11SS has already been opened due to the position of the table 14 in the formation of tuft T6. Since no movement of the table 14 is required to produce tuft T7, no command for movement of this table is given. Thus relay 7K does not pick up preparatory to effecting tuft T7. Instead, though, relay 8K is energized through switch 3ES and the presently closed contacts 7K1 and 11K3. Of course stepping switch 1S has been stepped to its seventh contact position, the wiper arms 1SAW and 1SBW engaging contacts 1SA7 and 1SB7, respectively. At this moment switch 3ES will be actuated into its open position to stop the table 22 at the proper location to effect tuft T7.

To prevent unwanted tufter clutching during transfer of table movement between the main table 14 and the upper table 22, there is provided a transfer relay 15K having contacts 15K1 in series with contacts 7K5, 8K2 which are all in parallel with the switch section MCS1 of the master cam switch.

*Direction Control*

Coming now to the manner in which the direction control is realized, attention is drawn to a plurality of control jacks JC1–JC49 which are connected to the various contacts of the switch level 1SC belonging to the stepping switch 1S. Although only several actual jacks are illustrated and only the first and 49th of these connected to level 1SC, it will be understood that a full complement of 49 jacks is used under the assumed set of circumstances, although it is completely arbitrary as to the exact number to be employed. These jacks JC1–JC49 are cooperable with a similar number of plugs PC1–PC49 which are connected directly to the negative bus B2. As viewed in FIG. 4 the jacks JC1–JC49 together with the plugs PC1–PC49 act so as to cause movement of the table 14 to the left. Therefore, the jacks JC1–JC49 and plugs PC1–PC49 constitute a "left" panel section 142L.

Similar provision is made for the movement of the table 2 in a direction away from the viewer in FIG. 1 and up when viewing the patch panel 142 of FIG. 4. Accordingly a plurality of jacks JD1–JD49 are connected to the various contacts of the switch level 1SD. These jacks JD1–JD49 are cooperable with plugs PD1–PD49 connected directly to the negative bus B2. Thus, this panel section will be referred to as an "Up" panel section 142U.

Further, inasmuch as it will be desired to have the apparatus automatically home itself after a given tufting cycle, jacks JE1–JE50 are connected to the various contacts of the switch level 1SE, these jacks being engageable or cooperable with a similar number of plugs PE1–PE50, which are connected to the negative bus B2. This panel section will be termed a home panel section 142H.

It will be observed that there is a conductor 184 connecting the wiper arm 1SCW of the level 1SC to the relay 4K. There is also a conductor 186 connecting the wiper arm 1SDW of the switch level 1SD to the relay 12K.

With the foregoing information in mind, it will be understood that any plug of the group PC1–PC49 belonging to the panel section 142L when plugged into any jack JC1–JC49 will operate the relay 4K to effect leftward movement of the table 14 when the wiper arm 1SCW reaches the plugged contact of the level 1SC. The relay 4K of course closes its contacts 4K1 to energize the relay 9K and as hereinbefore mentioned the energization of the relay 9K causes phase reversal so as to compel the motor M1 to rotate in the desired direction. Similarly any plug from the group PD1–PD49 belonging to the panel section 142U when plugged into any jack JD1–JD49 will operate the relay 12K and the conductor 186 upon the release of the relays 7K and 11K so as to permit the relay 4K to remain operated, if operated, or will operate relay 4K through contacts 12K1 if relay 4K1 has not been previously operated. Also, if the relay 12K is not operated upon release of relays 7K and 11K, relay 4K will be released to allow direction change for the end movement. This release of 4K is accomplished by shunting it with the negative bus B2 through contacts 12K2, all as in a manner hereinbefore dealt with. At the end of each tufting sequence the wiper arms 1SAW, 1SBW, 1SCW, 1SDW, and 1SEW are all advanced in unison to new contacts and hence to new control jacks. Therefore relays 4K and 12K will reset for each tuft that is to be made.

*Button Detection*

With specific reference now to the button detection circuitry it will be recalled that a brief allusion has already been made to relay 13K. Now reference will be made to additional relays that coact with this relay 13K in performing the button detecting operation. First, attention is called to slow operating relay 16K equipped with contacts 16K1 and secondly to relay 17K having contacts 17K1, 17K2, and 17K3, contacts 17K2 and 17K3 being of the "make before break" variety. As already indicated, the collective function of the relays 13K, 16K, and 17K is to make certain that there are no button misses and in case there is a button failure during the tufting operation, these three relays stop the automatic cycling that is taking place.

Continuing with the description of the button detecting feature, it will be seen that the auxiliary cam switch section ACS2 closes when caused to do so by the auxiliary cam 166, so that relay 17K picks up through the push button switch section 4PBS1, the contacts 17K2, 16K1 (the relay 16K is a slow operating relay as pointed out above), and this causes 17K to hold in through contacts 17K3 and 170. It is through the action of a correspondingly tufted button that the feeler 172 is moved in a direction to open the switch 170 to release relay 17K. If a tuft is missed for some reason, the relay 17K remains picked up when the switch ACS restores its switch section ACS1 to closed position at the end of that particular tufting sequence. This causes relay 13K to be energized through contacts 17K1. Relay 13K opens its contacts 13K1 and in turn opens the circuit to the relay 5K and stops the automatic cycling which is then scheduled to transpire. It will be noted that subsequent operation of the push button switch 4PBS will release the relay 17K because its contacts 4PBS1 break the circuit from the positive bus B1 to the relay 17K.

*Interlocking*

Special emphasis is placed on the presence of certain interlocks. As previously mentioned, with the tufter head 152a down the relay 3K is operated through the switch section MCS2 of the switch MCS. This prevents automatic starting or homing as the electrical path to the negative bus B2 is opened because the contacts 3K1 are at this time separated owing to the energization of the relay 3K. Also, at any time that table movement is occurring, relays 7K and 8K are operated, opening the holding circuit to the clutch relay 14K, since contacts 7K5 and 8K2 are in circuit with said relay 14K. Hence if the head 152a moves to its compressing position the relay 14K is released and the tufting apparatus awaits completion of the table movement. The relay 15K serves to prevent any momentary tufter clutching between transfer from the supervisory control of relay 7K to the relay 8K. Furthermore, side movement of the table 14 is limited by the switches 1LS and 2LS inasmuch as any opening of these two switches would energize start relay 5K and hence stop any auto cycling by dropping out this relay 5K.

*Manual Operation*

A further feature that has already been mentioned is the presence of the switch TS having an automatic position and a manual position. When the switch arm 2SW is manually moved into engagement with the contact 2TS1 the circuit through the tufter clutch solenoid 158 is through the contacts 14K1 of the clutch relay 14K. On the other hand, when the wiper arm TSW is moved into engagement with the contact TS2 the contacts 14K1 are bypassed and this permits manual tufting. Ordinarily no use will be made of the manual operation but if happenstance should cause a tuft to be missed, then this permits the forming of a tuft at the missed location.

*Sequence Selection*

From the foregoing description the general operation of my apparatus is believed readily apparent, especially since details of the operation have been given at the time the various components were first referred to. However, it will be advantageous, it is felt, if the preliminary steps in preparation for an automatic tufting cycle are outlined. In this regard we will assume that 39 tufts are desired and from FIG. 3 the relative locations of the various tufts and the table movements (as indicated by the directional arrows) can be observed. To effect the tuft locations the following tabulation will be of considerable help, it is believed. The tabulation designates the various tufts T1–T39 that are desired with the appropriate plug connections for achieving these tuft locations. The tabulation is as follows:

| | |
|---|---|
| T1 | P1 and J1. |
| T2 | P2 and J3. |
| T3 | P3 and J5. |
| T4 | P4 and J7. |
| T5 | P5 and J9. |
| T6 | P6 and J11. |
| T7 | P7 and J33. |
| T8 | P8 and J31, PC8 and JC8. |
| T9 | P9 and J29, PC9 and JC9. |
| T10 | P10 and J27, PC10 and JC10. |
| T11 | P11 and J25, PC11 and JC11. |
| T12 | P12 and J23, PC12 and JC12 |
| T13 | P13 and J45. |
| T14 | P14 and J47. |
| T15 | P15 and J49. |
| T16 | P16 and J51. |
| T17 | P17 and J53. |
| T18 | P18 and J55. |
| T19 | P19 and J77. |
| T20 | P20 and J75, PC20 and JC20. |
| T21 | P21 and J73, PC21 and JC21. |
| T22 | P22 and J71, PC22 and JC22. |
| T23 | P23 and J69, PC23 and JC23. |
| T24 | P24 and J67, PC24 and JC24. |
| T25 | P25 and J57, PD25 and JD25. |
| T26 | P26 and J59. |
| T27 | P27 and J61. |
| T28 | P28 and J63. |
| T29 | P29 and J65. |
| T30 | P30 and J43, PD30 and JD30. |
| T31 | P31 and J41, PC31 and JC31. |
| T32 | P32 and J39, PC32 and JC32. |
| T33 | P33 and J37, PC33 and JC33. |
| T34 | P34 and J35, PC34 and JC34. |
| T35 | P35 and J13, PD35 and JD35. |
| T36 | P36 and J15. |
| T37 | P37 and J17. |
| T38 | P38 and J19. |
| T39 | P39 and J21. |
| Step 40 | PE40 and JE40. |

In setting up the apparatus so as to effect the tufts T1–T39 the operator will first engage the plug P1 with the jack J1 on the patch panel 142 to form the tuft T1. Next he will engage the plug P2 with the jack J3. However, for purpose of simplicity the plug P2 is not actually shown although it will be understood that it has electrical connection with the contacts 1SA2 and 1SB2 of the stepping switch levels 1SA and 1SB.

This procedure is quite straightforward until one comes to the contemplation of tuft T8. In preparation for the formation of the tuft T8 it is necessary to have the table 14 moved to the left as viewed in FIGS. 1 and 3. To achieve this movement it is necessary that a direction control be incorporated into the table movement sequence and this is done by engaging the plug PC8 with the jack JC8. This commands the table 14 to move to the left because side direction relay 4K now picks up and since a continued leftward movement is desired for tufts T9–T12 in following the particular sequence set forth in FIG. 3 plug PC9 will have to be engaged with JC9 and likewise PC10 with JC10, PC11 with JC11 and PC12 with JC12. For easy reference the various plug connections are all tabulated, as above mentioned, and it is thought that the reader will have no real difficulty in understanding the plugging arrangement that is required. One tufting location that might offer some trouble, however, is in understanding how the tuft T25 plugging connections are to be made. It will be observed from the pattern of FIG. 3 that in forming the tuft T25, it is necessary that the table 22 be moved in what will be termed an upward direction, although actually it is a lateral or end direction away from the reader as viewed in FIG. 1, since the tables 14 and 22 move in horizontal parallel planes. However, it is "up" when viewing the plug and jack panels. At any rate, to produce the tuft T25, the operator will engage the plug PD25 with the jack JD25 and the end direction relay will pick up when contact 1SD25 is reached by the wiper arm 1SDW. Another point where difficulty might be encountered is in the formation of the tuft T30. In this situation the plug PD30 is engaged with the jack JD30. In order to move to the next tufting location the plug PC31 is engaged with the jack JC31. Finally, it should be explained that after the tuft T39 has been made then it is necessary to bring the tables 14 and 22 back to their home position. Inasmuch as the tuft T39 is the final tuft under the exemplifying circumstances, it is necessary to plug the plug PE40 into the jack JE40 and this will command the tables to move back to their home position upon reaching the 40th step of the stepping switch 1S, more specifically contact 1SE40. This homing operation is inaugurated by causing the relay 2K to pick up and the ensuing operation is the same as if the push button switch 3PBS had been depressed to close contacts 3PBS2.

Of course while a particular tufting sequence has been diagrammed in FIG. 3 it will be appreciated that other sequences might be utilized and that the apparatus is sufficiently versatile so that the user thereof may select his own pattern. In other words, the particular pattern shown in FIG. 3 is only illustrative. Also as already stated hereinbefore the particular number of plugs and jacks is completely arbitrary and dependent upon the particular circumstances involved in carrying out the work performing operations. Similarly while the switch levels 1SA, 1SB, 1SC, 1SD, 1SE all contain 51 fixed contacts, the number of contacts may be varied to suit special conditions. With the arrangement set forth it is only possible to form 49 tufts inasmuch as one of the contacts of each stepping switch level is a homing contact and one contact is required for commanding the system to home at the end of any tufting sequence. If a full complement of 77 tufts were desired, as is possible from the number of jacks on the patch panel, then the number of contacts provided in the stepping switch 1S would have to be increased to 78 each plus the home position contact. Also it will be appreciated that normally there will not be a need for as many plugs PC1–PC49, PD1–PD49, PE1–PE50 and the jacks JC1–JC49, JD1–JD49, JE1–JE50. Also it will be understood that the number of plugs PC1–PC49, PD1–PD49, and PE1–PE50 need not correspond with the number of jacks JC1–JC49, JD1–JD49, and JE1–JE50.

Summary of Operation

While the operation of the apparatus is believed readily apparent from the information that has already been given, particularly the explanation presented under the heading "General Operation," nonetheless a succinct summary of what has been said will probably be of value in appreciating to the fullest extent the merits of the instant invention. Accordingly it will be assumed that the push button 1PBS has been closed so as to energize relay 1K. This relay operates and remains operated through its own contacts until released by operation of the push button 2PBS. Operation of the relay 1K in turn applies 3 phase power to the tufter motor 154 and also to the table motor M1.

After turning on the power as described in the preceding paragraph the normal operation of the system may require homing of the tables 14 and 22. This is accomplished by operation of the push button 3PBS. If the tufter head needle is clear of the mattress, relay 3K will be in a non-operated position, thereby providing a circuit through its normally closed contacts 3K1 so as to energize the coil of the relay 2K. The relay 2K will remain operated until the stepping switch 1S1 is homed. At that time contacts 1SK3 will open. Upon the table 14 reaching its home position, contacts 1SHS will, of course, be open.

The stepping switch S1 interrupts itself to stop to its home position where the off-normal contacts 1SK open to stop the stepping procedure. At this point off-normal contacts 1SK2 close, thereby operating relay 6K and lighting the lamp 176. The circuit thus established through the home position switch 1SHS operates the relay 7K and the relay 8K which cause the table 14 to move in the side direction to the home position at which point the relay 7K releases and thus allows the relay 8K to operate. The operation of the relay 8K causes the table 22 to move to its home position.

At this time, provided the tufter head 152 is clear, operation of the push button 4PBS energizes the coil of the stepping switch 1S, thereby loading its stepping spring, and on release of the button 4PBS the stepping switch steps to its first contact position labelled 1SA1 and at the same time operates its off-normal contacts.

The tuft plug P1 is connected through to the side position switch 1SS and the end position switch 1ES. If the table is not in the position defined by these two switches, side control relay 7K is operated by a circuit passing through the side switch 1SS. Relay 7K then operates, clutching in the side movement and the particular switch which is 1SS is opened by the operating cam 109. This releases relay 7K and applies the side brake.

Generally speaking, on release of the relay 7K the end control relay 8K operates. The operation of the relay 8K causes end movement of the table 22 until the end switch 1ES is open. However, under the assumed state of conditions there is no need for end movement of the table 22 in making tufts T1–T6.

As the first tuft T1 is completed, relay 3K is released and the stepping switch 1S steps to its next step. This repeats the table moving procedure with side movement always being made first by the slow release of the relay 11K.

Actually no end movement is needed in making the tufts T1–T6 as can be readily understood by reference to FIG. 3. Still further, it will be readily apparent, it is believed, that the tuft T7 will be automatically produced without the need of plugging in any of the directional control jacks of panel sections 142L and 142U. It is only when tuft T8 is to be effected that one must resort to the use of plug PC8 with the jack JC8. Such a disposition of the plug PC8 orders the table 14 to move to the left because the side direction relay 4K now picks up and inasmuch as a progressive leftward movement is desired in producing the tufts T9–12 plug PC9 will initially have been inserted in the jack JC9 and similarly plug PC10 with jack JC10, plug PC11 with jack JC11, and plug PC12 with jack JC12. Resort to the previously presented tabulation will show these particular connections.

While all the tufts have not been described with complete particularity, nonetheless it is felt that sufficient information has now been presented so that a complete and full operation of the apparatus can readily be understood.

*General Conclusions*

Basically, then, the foregoing system embraces an arrangement whereby if a certain preselected condition is satisfactorily met, the way is paved for meeting a second predetermined condition and so on through an entire sequence of conditions. The system is exceptionally versatile inasmuch as in one situation one number of conditions may be met; in another situation a different number of conditions may be dealt with and the conditions themselves may be different, as for instance when a change is to be made in the location of mattress tufts in a succeeding mattress from a preceding one.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A programmed controller comprising support means for moving a member in different angular directions including a first table constrained to move in a first rectilinear path and a second table mounted on said first table constrained to move in a second rectilinear path normal to said first path, an electric motor, first electromagnetic means for clutching said motor to said first table, second electromagnetic means for clutching said motor to said second table, a stepping switch having first and second levels of contacts and respective wiper arms operated in unison to engage said contacts in succession, panel means including selectively engageable plugs and jacks, a first group of spaced switches disposed for actuation by said first table, a second group of spaced switches disposed for actuation by said second table, said plugs and jacks when engaged connecting one switch of said first group to the first contact of said first level, a second switch of said first group to the second successive contact of said first level and so on whereas said plugs and jacks when engaged also connect one switch of said second group to the first contact of said second level, a second switch of said second group to the second successive contact of said second level and so on, means in circuit with said first group of switches for energizing said first electromagnetic means to cause said motor to move said first table in said first path until said one switch of said first group is actuated to deenergize said first electromagnetic means, means responsive to deenergization of said energizing means for energizing said second electromagnetic means if the position of said second table called for by the particular plug and jack engagement is out of line from said first path to thereby cause said motor to move the second table in said second path until said one switch of said second group is actuated to deenergize said second electromagnetic means.

2. A programmed controller in accordance with claim 1 including means for advancing said stepping switch to the next contact position of said first and second levels after said second table has reached its called for position, thereby to energize said circuit means in circuit with said first group of switches to cause energization once again of said first electromagnetic means.

3. A programmed controller in accordance with claim 2 in which said stepping switch includes third and fourth contact levels having respective wiper arms operated in unison with said previously mentioned wiper arms, reversing means for the electric motor, and in which said panel means includes additional plug and jacks selectively engageable so as to energize said reversing means at selected points in the paths of said tables whereby the tables may be reversed in direction at said selected points in order to effect a general program of positioning called for by the selective engagement of said first-mentioned plugs and jacks.

4. A programmed controller in accordance with claim 3 in which said stepping switch includes a fifth contact level having a wiper arm operated in unison with the four previously mentioned wiper arms and in which said panel means includes still additional plug and jacks selectively engageable with each other for connecting with a desired contact of said fifth level to effect homing of said tables, an additional switch in said first switch group and an additional switch in said second switch group, both of said additional switches being situated at locations representative of the home positions of said tables, and means operable upon the fifth wiper arm reaching said desired contact of said fifth switch level to cause successive energization of said first and second electromagnetic means and said reversing means to cause said tables to return to their home positions.

References Cited in the file of this patent

UNITED STATES PATENTS

| | | |
|---|---|---|
| 1,215,095 | Alexanderson | Feb. 6, 1917 |
| 1,650,748 | Thomas | Nov. 29, 1927 |
| 1,954,657 | Welch | Apr. 10, 1934 |
| 2,221,464 | Zahodiaken | Nov. 12, 1940 |
| 2,427,493 | Bullard | Sept. 16, 1947 |
| 2,528,736 | Bullard | Nov. 7, 1950 |
| 2,614,714 | Erhardt | Oct. 21, 1952 |
| 2,649,943 | Meyers | Aug. 25, 1953 |
| 2,739,626 | Southworth et al. | Mar. 27, 1956 |
| 2,748,665 | Senn | June 5, 1956 |
| 2,820,187 | Parsons et al. | Jan. 14, 1958 |
| 2,826,087 | Diener | Mar. 11, 1958 |
| 2,835,042 | Tandler et al. | May 20, 1958 |
| 2,837,046 | Carson et al. | June 3, 1958 |
| 2,838,963 | Good et al. | June 17, 1958 |
| 2,838,967 | Meyer | June 17, 1958 |
| 2,920,588 | Bronstien et al. | Jan. 12, 1960 |

UNITED STATES PATENT OFFICE
CERTIFICATE OF CORRECTION

Patent No. 3,042,171                                                             July 3, 1962

Glenn R. Rose

It is hereby certified that error appears in the above numbered patent requiring correction and that the said Letters Patent should read as corrected below.

Column 7, line 55, for "of the" read -- the off --; column 11, line 48, for "TT" read -- 22 --; column 12, line 50, for "2" read -- 22 --; column 16, line 36, for "stop" read -- step --; line 41, for "posiiton" read -- position --; same column 16, line 45, after "its" insert -- end --.

Signed and sealed this 1st day of January 1963.

(SEAL)
Attest:

ERNEST W. SWIDER                                          DAVID L. LADD
Attesting Officer                                             Commissioner of Patents